Oct. 2, 1934.　　　S. C. CALEF　　　1,975,191

HAM SAW GAUGE

Filed Nov. 3, 1931　　2 Sheets-Sheet 1

Sewell C. Calef
INVENTOR

WITNESS

BY
ATTORNEY

Oct. 2, 1934.   S. C. CALEF   1,975,191
HAM SAW GAUGE
Filed Nov. 3, 1931   2 Sheets-Sheet 2

Sewell C. Calef
INVENTOR

WITNESS

BY
ATTORNEY

Patented Oct. 2, 1934

1,975,191

UNITED STATES PATENT OFFICE 1,975,191

HAM SAW-GAUGE

Sewell C. Calef, Chicago, Ill., assignor to Industrial Patents Corporation, Chicago, Ill., a corporation of Delaware Application November 3, 1931, Serial No. 572,745

10 Claims. (Cl. 17—1)

The invention seeks uniformity and accuracy in the cutting of hams from the carcasses of hogs. As generally practiced the sawing of hams depends upon the idea and eye of the individual, hence varies with the same and different operators and the result is lacking in uniformity.

The present invention provides a guide and gauge adapted for scribe saws, such as generally used for cutting carcasses, and particularly for sawing the ham from the carcass of a hog. In this manner the ham is cut the proper length and the angle of cutting is uniform in all hams.

Referring to the drawings hereto attached:

Corresponding and like parts are referred to in the following description and indicated in the several views of the drawings by like reference characters.

Figure 1:
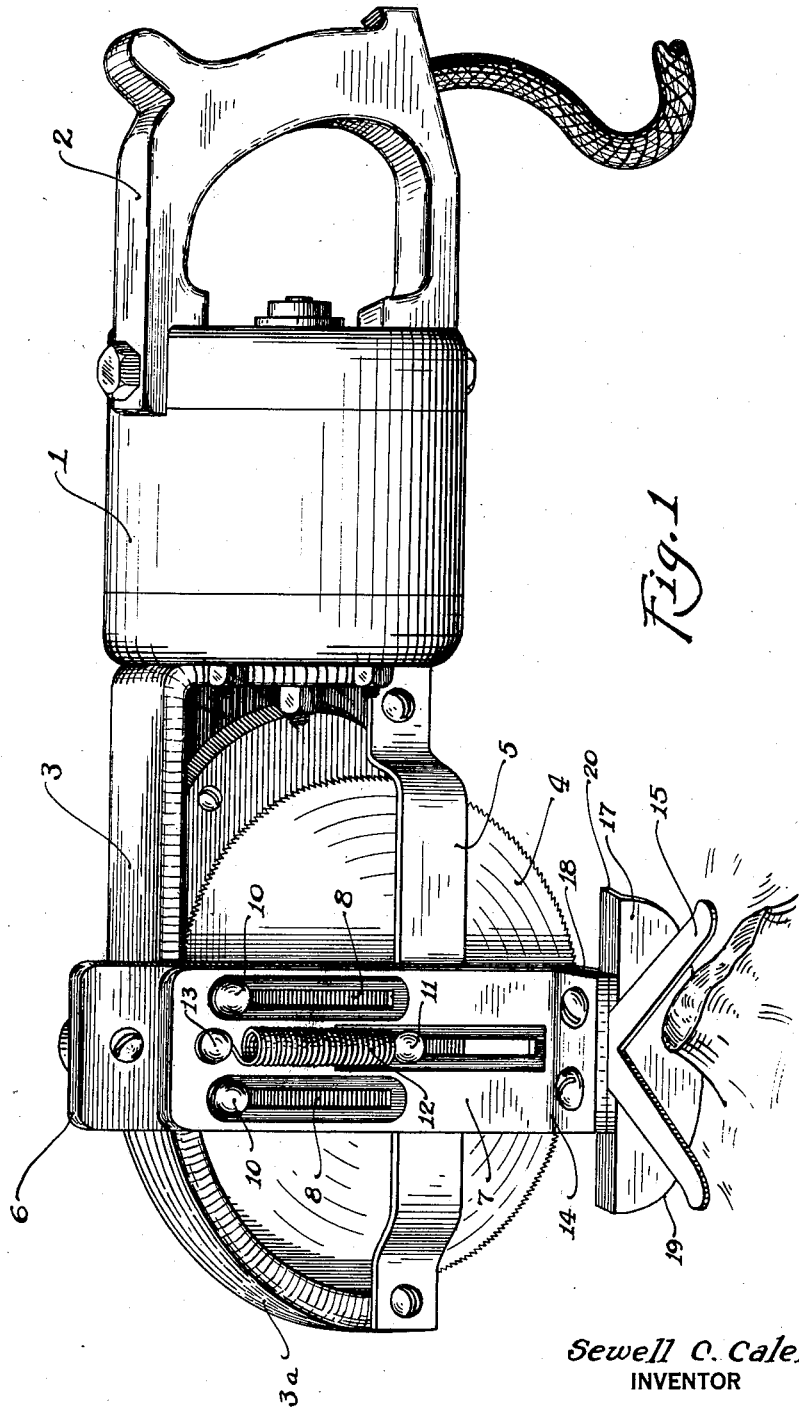
Figure 1 is a side view of a scribe saw equipped with a guide and gauge embodying the invention.
Figure 2:
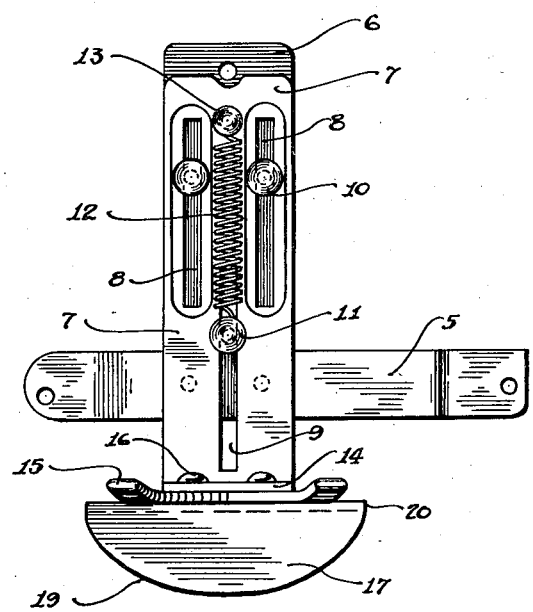
Fig. 2 is a front view of the guide and gauge attachment detached from the saw.
Figure 3:
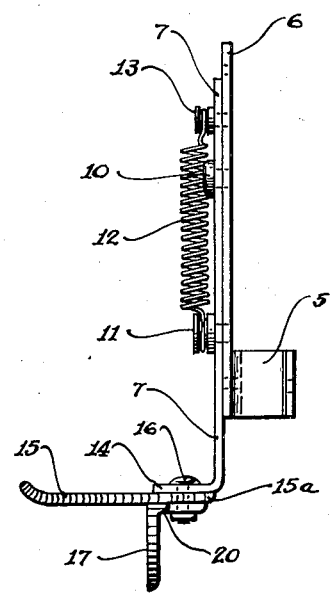
Fig. 3 is an edge or side view of the attachment.
Figure 4:
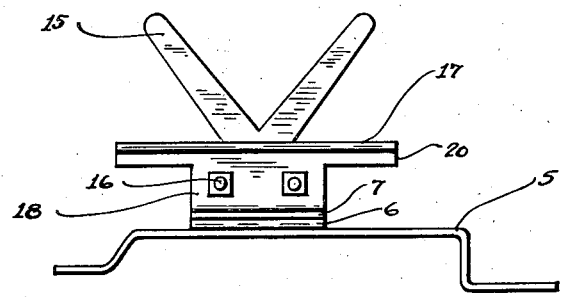
Fig. 4 is a bottom plan view thereof.

The scribe saw illustrated is of ordinary construction, as generally used for cutting up carcasses, and comprises an electric motor 1 to which are attached a handle 2 and frame 3. The rotary cutter 4 consists of a saw which is driven from the motor 1 in a manner well understood.

The attachment comprises a bar 5 which has its end portions offset in the same direction and attached to the frame 3 by suitable fastening means. The bar 5, which is disposed longitudinally of the scribe saw, is located at the lower portion thereof in substantial parallelism with the top portion of the frame, and it extends from the motor casing to the outer end of the downwardly curved portion 3ª of frame 3 and it constitutes a combined guard and supporting member. A vertical plate 6 disposed at a right angle to the bar 5 and diametrically with relation to the rotary cutter, bridges the space between the bar and the top of the frame and is attached to the latter at its lower end and at its upper end to the top portion of the frame 3. These parts, bar 5 and plate 6, are fixed and constitute a support for the guide and gauge.

A plate 7 is mounted on the plate 6 of the support to slide freely thereon and diametrically of the rotary cutter and is formed with a pair of upper slots 8 and a single lower slot 9 disposed in line with the space formed between the slots 8. Headed studs 10 secured to the plate 6 engage the slots 8. A headed stud 11 secured to the plate 6 engages the slot 9. These studs and coacting slots direct the plate 7 in its movements and retain it in place on the support. A coil spring 12 is connected at its lower end to the stud 11 and at its upper end to a stud 13 attached to the upper end of the plate 7. The lower end of the plate 7 is offset, as indicated at 14, to provide convenient means for attaching the guide and gauge thereto.

The lower offset or outwardly extending portion 14 is arranged at right angles to the plate 6, which, with the said projecting portion 14, forms a substantially L-shaped slidable bracket which is yieldably maintained in an extended depending position by the coiled spring 12.

The numeral 15 designates the aitch bone guide and consists of a fork, the prongs of which are angularly disposed at about 80 degrees. The aitch bone guide 15 which is arranged at right angles to or perpendicular to the plate 6 of the bracket is disposed horizontally when the plate 6 is vertical and extends laterally with respect to the scribe saw. The prongs of the fork diverge outwardly and form an open mouth guide, which is adapted to fit readily bones of different sizes. The shank of this guide 15ª is secured to the lower face of the offset end 14 of the plate 7 by bolts 16 or other fastening means. The ends of the prongs are deflected slightly in an upward direction for convenience in the application and use of the guide.

The gauge which fixes the distance from the aitch bone at which the saw cuts the hip bone and the tail bone includes a plate 17 and shank 18, the latter being secured to the lower offset end 14 of the plate 7 by the fastenings 16. The gauge plate 17 is substantially segmental and depends from and is arranged at right angles to the shank or attaching portion 18 as at 20, and the lower or outer edge of the plate 17 is curved throughout its length, as designated at 19. The plate 17 is disposed perpendicular to the guide plate 15 to engage the exposed portion of the aitch 15 to engage the exposed portion of the aitch bone at the end which is toward the butt end of the ham, while a prong of the guide 15 rides against the side of and parallel with the exposed portion of the aitch bone, thereby insuring the proper angle for the cut.

In practice as the moving carcass to be cut drops to the table, the cutter is adjusted with the guide prong 15 lying against the side of and parallel with the exposed portion of the aitch bone and the plate 17 engaging the exposed portions of the aitch bone at the end which is toward the butt end of the ham and thereby assures the cut-off of the ham at the proper angle. At the same time the outer curved edge 19 of the approximately segmental plate 17 is in contact with the lean meat of the ham at the junction of the lean meat with the exposed portion of the aitch bone at the end toward the butt end of the ham, thereby assuring the correct sawing of the ham away from the remainder of the carcass.

The ham saw guide and depth gauge provides means whereby guesswork is eliminated in cutting off the hams of a hog so that the finished product will have a symmetrical contour. When sawing through the hip bone (shaft of the ilium) and through the base of the tail bone of a hog (the coccygeal vertebra), which unites the ham and the loin, prior to cutting the ham from the carcass, it is necessary to saw the hip bone (shaft of the ilium) at a point two and one-half inches from the end of the exposed portion of the aitch bone at the end toward the butt end of the ham. The distance from the outer surface of the plate 17 to the teeth of the saw is two and one-half inches; therefore the correct sawing of the hip bone (shaft of the ilium) and the tail bone (coccygeal vertebra) at the butt end of the ham is assured. It is also necessary to saw through these bones at such an angle as to allow a center line angle of 80° from shank end to butt end when ham is standing on its butt on a flat horizontal surface. The present invention insures constant accuracy in making these cuts without depending on individual calculation or guesswork in making the cuts and without producing the variations in the finished product which necessarily result from individual calculation or guesswork. One of the greatest advantages of the ham saw guide and gauge is the ease with which a new operator may be taught to properly saw hams from the remainder of the carcass.

Prior to the present invention the sawing of hams was a matter of the individual eye and idea and the eye and idea differed from day to day operator to operator. Under the old conditions it was necessary for the foreman of a gang of operators to spend a great deal of his time with his rule and measuring gauge checking the accuracy of the ham sawer, or in teaching a new operator. The present invention eliminates these difficulties and is far superior to the old method as any individual with average intelligence can very easily saw all hams at the proper angle and depth with the device of the present invention.

In this specification the word "butt" is used to designate the plane surface made by a knife cut when separating the ham from the carcass, at the end of the ham. The term "butt end" is used to denote the thick end of the ham as distinguished from the shank or thin end.

The exposed bone which may be noticed on the face or lean side of the ham near the butt end is commonly known in the meat packing industry as the aitch bone. This bone is part of the pubis bone which in turn is a portion of the innominate or hip bone.

The exposed aitch bone lies on the face or lean side of a ham near the butt end. It varies in length and width according to the size of the ham. The average exposed portion on a commercial ham is about three inches long and ⅜ inch wide.

In using the device of the present invention, the guide prong 15 is placed against and parallel with the side of the aitch bone on the side nearest to the ham butt. This determines the angle at which the hip bone and tail bone are to be sawed off, and at the same time indicates the angle of the line where the ham is to be cut away from the carcass. It will be noted that there are two prongs 15, one to be used for hams on the right side of the carcass, the other to be used when sawing hams from the left side of the carcass.

The plate 17 engages the exposed portion of the aitch bone at the end which is toward the butt end of the ham. When in this position the saw blade will be 2½ inches away from the end of the aitch bone, which is the correct distance for sawing hams from the carcass.

The curved edge 19 of the plate is in contact with the lean meat of the ham, and acts as a runner or rocker to facilitate the movement of the cutting device.

What is claimed is:—

1. The combination with a cutter for separating the ham from the carcass of a hog, of a guide for positioning the cutter to the proper angle, said guide comprising angularly disposed prongs extending outwardly substantially at right angles to the plane of the cutter to engage over the aitch bone with one of the prongs riding thereon.

2. The combination with a cutter for separating the ham from the carcass of a hog, of a guide extending outwardly substantially at right angles to the plane of the cutter for positioning the cutter to the proper angle and a depending gauge arranged at substantially right angles to the guide for limiting the distance of the cut from the aitchbone, both acting jointly with the aitch bone.

3. An attachment for a carcass cutter of the character specified comprising a support, a member slidable on the support in a direction diametrically of the cutter and an angle guide and a gauge carried by the said member, the guide extending outwardly substantially at right angles to the plane of the cutter and the gauge depending from the guide substantially at right angles thereto.

4. An attachment for a carcass cutter of the character specified comprising a support, a member slidable on the support in a direction diametrically of the cutter, a guide and a gauge carried by the said member, the guide comprising angularly disposed prongs extending outwardly substantially at right angles to the plane of the cutter, and the gauge depending from the guide substantially at right angles thereto and having a longitudinally curved edge.

5. An attachment for a carcass cutter of the character specified comprising a support, a member slidable on the support in a direction diametrically of the cutter and having longitudinal slots therein, studs applied to the support and engaging the slots of the member to retain it in place and direct it in its sliding movements, and a guide and a gauge carried by the said member, the guide extending outwardly substantially at right angles to the plane of the cutter and the gauge depending from the guide substantially at right angles thereto.

6. The combination with a cutter for separating the ham from the carcass of a hog, of an aitch bone guide carried by the cutter and projecting therefrom at right angles to the plane of the cutter for engaging the aitch bone to position the cutter at the proper angle.

7. An attachment for a carcass cutter, a slidable member movable diametrically of the cutter, means for mounting the slidable member on a carcass cutter, a guide and gauge carried by said slidable member, the guide extending outwardly substantially at right angles to the plane of the cutter and the gauge depending from the inner portion of the guide substantially at right angles thereto, and means for yieldably holding the slidable member in an extended position with relation to the carcass cutter.

8. A ham saw gauge comprising a gauge for controlling the distance from the aitch bone at which the saw cuts the ham from the carcass and an aitch bone guide arranged at an angle relative to each other.

9. A ham saw gauge comprising a gauge for controlling the distance from the aitch bone at which the saw cuts the ham from the carcass and an aitch bone guide, said aitch bone guide comprising angularly disposed prongs extending outwardly substantially at right angles to the plane of the said gauge, and adapted to engage the aitch bone with one of the prongs riding thereon.

10. In a ham saw gauge, an aitch bone guide comprising angularly disposed prongs.

SEWELL C. CALEF.